(12) United States Patent
Kolen et al.

(10) Patent No.: US 10,657,934 B1
(45) Date of Patent: May 19, 2020

(54) ENHANCEMENTS FOR MUSICAL COMPOSITION APPLICATIONS

(71) Applicant: Electronic Arts Inc., Redwood City, CA (US)

(72) Inventors: John Kolen, Foster City, CA (US); Harold Henry Chaput, Belmont, CA (US); Navid Aghdaie, San Jose, CA (US); Kazi Atif-Uz Zaman, Foster City, CA (US); Kenneth Alan Moss, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/366,632

(22) Filed: Mar. 27, 2019

(51) Int. Cl.
*G10H 1/00* (2006.01)
*G06N 3/04* (2006.01)

(52) U.S. Cl.
CPC ............ *G10H 1/0025* (2013.01); *G06N 3/04* (2013.01); *G10H 2210/026* (2013.01); *G10H 2210/036* (2013.01); *G10H 2210/105* (2013.01); *G10H 2210/111* (2013.01); *G10H 2250/311* (2013.01)

(58) Field of Classification Search
CPC .......... G10H 1/0025; G10H 2210/036; G10H 2210/111; G10H 2210/105; G10H 2250/311; G10H 2210/026; G06N 3/04
USPC .......................................................... 84/600
See application file for complete search history.

(56) References Cited

U.S. PATENT DOCUMENTS

| | | |
|---|---|---|
| 5,142,961 A | 9/1992 | Paroutaud |
| 5,315,060 A | 5/1994 | Paroutaud |
| 5,648,627 A | 7/1997 | Usa |
| 5,808,219 A | 9/1998 | Usa |
| 6,084,168 A | 7/2000 | Sitrick |
| 6,297,439 B1 * | 10/2001 | Browne ............... G10H 1/0025 84/635 |
| 6,353,174 B1 | 3/2002 | Schmidt |
| 6,482,087 B1 | 11/2002 | Egozy |
| 6,898,729 B2 | 5/2005 | Virolainen |
| 8,119,898 B2 | 2/2012 | Bentson |
| 8,653,349 B1 | 2/2014 | White |
| 9,418,636 B1 | 8/2016 | Malluck |
| 9,866,731 B2 | 1/2018 | Godfrey |
| 10,395,666 B2 | 8/2019 | Cook |

(Continued)

FOREIGN PATENT DOCUMENTS

WO    WO 2018/122730    7/2018

*Primary Examiner* — Jeffrey Donels
(74) *Attorney, Agent, or Firm* — Knobbe, Martens, Olson & Bear, LLP

(57) ABSTRACT

Systems and methods are provided for enhancements for musical composition applications. An example method includes receiving information identifying initiation of a music composition application, the music composition application being executed via a user device of a user, with the received information indicating a genre associated with a musical score being created via the music composition application. One or more constraints associated with the genre are determined, with the constraints indicating one or more features learned based on analyzing music associated with the genre. Musical elements specified by the user are received via the music composition application. Musical score updates are determined based on the musical elements and genre. The determined musical score updates are provided to the user device.

17 Claims, 8 Drawing Sheets

(56) References Cited

U.S. PATENT DOCUMENTS

| | | |
|---|---|---|
| 2002/0005109 A1 | 1/2002 | Miller |
| 2002/0134222 A1 | 9/2002 | Tamura |
| 2003/0064746 A1 | 4/2003 | Rader et al. |
| 2003/0094093 A1 | 5/2003 | Smith |
| 2003/0164084 A1 | 9/2003 | Redmann |
| 2003/0188626 A1* | 10/2003 | Kriechbaum ........ G10H 1/0008 84/609 |
| 2004/0131200 A1 | 7/2004 | Davis |
| 2005/0260978 A1 | 11/2005 | Rader et al. |
| 2006/0180005 A1* | 8/2006 | Wolfram ............ G10H 1/0025 84/609 |
| 2007/0028750 A1 | 2/2007 | Darcie |
| 2007/0039449 A1 | 2/2007 | Redmann |
| 2007/0140510 A1 | 6/2007 | Redmann |
| 2007/0245881 A1 | 10/2007 | Egozy |
| 2007/0261535 A1* | 11/2007 | Sherwani ............ G10H 1/0025 84/609 |
| 2008/0113797 A1 | 5/2008 | Egozy |
| 2008/0165980 A1 | 7/2008 | Pavlovic et al. |
| 2009/0066641 A1 | 3/2009 | Mahajan |
| 2009/0071315 A1* | 3/2009 | Fortuna ................ G10H 1/0025 84/609 |
| 2009/0320669 A1 | 12/2009 | Piccionelli |
| 2014/0254828 A1 | 9/2014 | Ray et al. |
| 2014/0334644 A1 | 11/2014 | Selig et al. |
| 2015/0143976 A1 | 5/2015 | Katto |
| 2015/0179157 A1* | 6/2015 | Chon .................. G10H 1/0066 84/645 |
| 2016/0379611 A1* | 12/2016 | Georges ............. G10H 1/0025 84/613 |
| 2017/0005634 A1 | 1/2017 | Raz et al. |
| 2017/0092247 A1* | 3/2017 | Silverstein ............. G06N 7/005 |
| 2017/0110102 A1* | 4/2017 | Colafrancesco ....... G10H 1/361 |
| 2017/0140743 A1* | 5/2017 | Gouyon ................ G06F 16/639 |
| 2017/0357479 A1 | 12/2017 | Shenoy et al. |
| 2018/0271710 A1 | 9/2018 | Boesen et al. |
| 2018/0322854 A1* | 11/2018 | Ackerman ........... G10H 1/0025 |
| 2018/0349492 A1 | 12/2018 | Levy et al. |
| 2019/0018644 A1 | 1/2019 | Kovacevic et al. |
| 2019/0237051 A1* | 8/2019 | Silverstein ........... G10H 1/0025 |

* cited by examiner

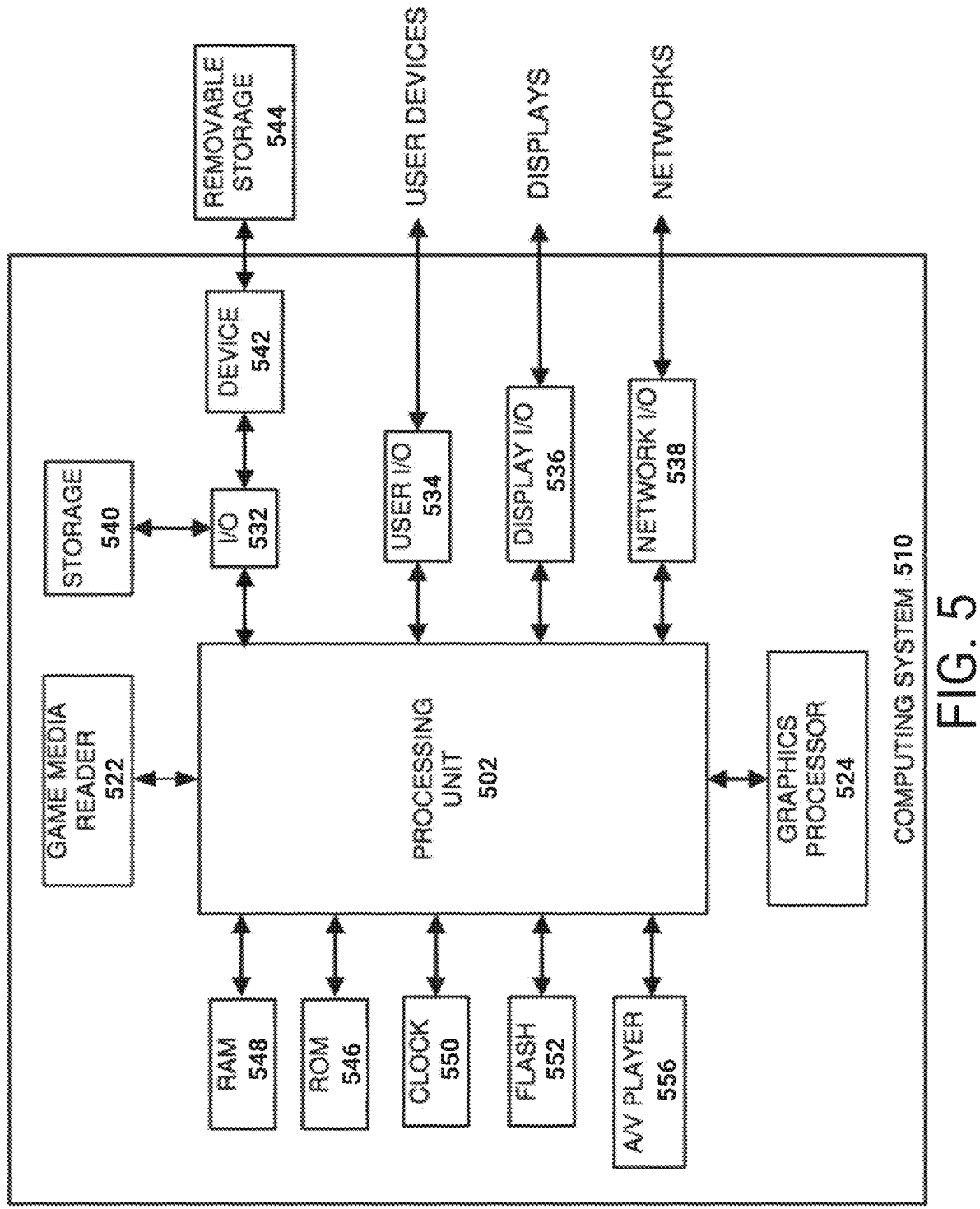

US 10,657,934 B1

ENHANCEMENTS FOR MUSICAL COMPOSITION APPLICATIONS

TECHNICAL FIELD

The present disclosure relates to systems and techniques for creating musical scores. More specifically, this disclosure relates to intelligent adjustments of musical scores.

BACKGROUND

Modern electronic games (e.g., video games) include a substantial amount of music. For example, there may be hours, or tens of hours, of pre-recorded music available for output during gameplay of an electronic game. Different portions of the music may be selected by the electronic game based on a current game context associated with the electronic game. For example, if a user reaches a certain level then the electronic game may output music corresponding to this certain level. As another example, if the user obtains a particular item then the electronic game may output music, such as a melody or short musical phrase, corresponding to obtaining the particular item. With respect to an open-world electronic game, the electronic game may output background music during gameplay.

It may be appreciated that with the increase in musical complexity enabled by modern-day devices (e.g., consoles, personal computers, and so on), a composer may spend a great quantity of time generating different scores. As an example, the composer may utilize music composition software to specify notes corresponding to a portion of music. Due to this increased musical complexity, for example based on modern devices having improved processing elements, the composer may therefore have to compose for multitudes of disparate instruments in a same portion of music. Since any electronic game may require quite varied, and lengthy, portions of music, there may be a technical constraint associated with a speed at which the composer is able to create musical scores.

At present, music composition software is limited to receiving selections of specific notes, tempos, and so on, and recording these selections. Some music composition software may enable the playing of the selections, such as utilizing Musical Instrument Digital Interface (MIDI) software. There is a technical need for enhanced musical composition software which enables user efficiency and experience improvements.

SUMMARY OF CERTAIN EMBODIMENTS

Particular embodiments of the subject matter described in this specification can be implemented so as to realize one or more of the following advantages. Utilizing the techniques described herein, musical composition software or applications may reduce a time associated with creation of musical scores. As will be described, a musical composition application may advantageously recommend musical phrases or passages based on previously input musical notes. For example, the application may recommend minutes, or even hours, of a musical score. Additionally, the musical composition application may adjust musical notes specified by a user according to different constraints. For example, the musical composition application may adjust, or recommend that the user adjust, one or more musical notes based on the musical notes not conforming to rules of counterpoint, a genre selected for the music, and so on. Additionally, the musical composition application may advantageously identify whether a musical phrase or portion is similar to that of a pre-existing musical phrase or portion.

Utilizing one or more of the above-described technical enhancements, a composer may efficiently create multitudes of musical scores. These musical scores may be assured to conform to specified constraints and to not unknowingly borrow from existing musical compositions. Thus, and as will be described, the composer may more rapidly create musical scores through leveraging the techniques described herein.

Music is increasingly being relied upon to impart emotion or contextual cues into electronic games, movies, television shows, and so on. With respect to electronic games, modern electronic games may utilize music to convey complex emotions rather than merely serve as semi-repetitive background music for the user to enjoy. Additionally, given the increase in processing power available to modern electronic games, the composer may be incentivized to create more complex music than for prior electronic games. These added complexities may increase a time associated with creation of musical scores for a modern electronic game.

For example, a composer may be required to create substantially varying music for different scenarios, events, and so on, included in an electronic game. Since the composer may be working on multiple electronic games at a same time, the composer may unknowingly leverage similar musical passages or portions for the electronic games. This may reduce a user experience of a player playing the electronic games. Indeed, the user may recognize these musical passages or portions, or may find the music too similar in a first game to that of the music in a second game.

As another example, a composer may create music according to a certain style appropriate for a portion of an electronic game. In this example, the composer may create music which corresponds to jazz, rock n roll, hip hop, and so on. It may be appreciated that these styles may have certain characteristics, or generalities, associated with their underlying compositions. For example, certain types of rock n roll may, in general, utilize certain scales (e.g., a pentatonic scale). As another example, certain types of electronic music may generally utilize a certain time signature and beats per minute. In these examples, the composer may strive to impart these characteristics into a musical composition, such that the resulting music sticks to the corresponding style.

Advantageously, the techniques described herein may address, at least, these compositional difficulties. For example, a music composition application may determine musical phrase recommendations. In this example, the music composition application may ensure that the recommended musical phrase is in a same style as the style being followed by the user. As an example, if the user is creating music in a be-bop jazz style, then the music composition application may recommend a musical phrase in this style. In this way, the composer may specify musical notes for inclusion in a musical score. As the composer specifies the musical notes, the music composition application may recommend additional musical notes, tempo, key changes, and so on, for consideration by the composer. Advantageously, the music composition application may automatically play (e.g., via MIDI synthesizers) the recommended musical notes. The composer may then approve the inclusion of these recommendations.

With respect to determining musical phrase recommendations, the musical composition application may thus substantially reduce a time associated with musical composition. Indeed, and as will be described, a composer may specify a certain theme or melody. The musical composition application may then expound upon this specified theme or melody. For example, the musical score application may generate one or more measures for inclusion in the musical score. Advantageously, these generated measures may conform to a same musical style as being utilized by the composer. Thus, the musical score application may rapidly auto-complete a musical score being created by the composer.

Furthermore, the musical score application may generate recommended musical notes which conform to an emotion or feeling the composer is trying to achieve. For example, the composer may create a musical score which is designed to cause a user to feel a sense of dread. This musical score may be associated with a portion of an electronic game in which a final boss battle is about to occur. The musical score application may therefore present recommended musical notes, such as included in one or more measures, which achieve this sense of dread. As will be described, artificial intelligence techniques may be leveraged to learn a meaning associated with emotion. As a non-limiting example of such artificial intelligence techniques, a recurrent neural network may be utilized to generate sequences of musical notes according to certain constraints.

In addition to recommending musical notes, the musical score application may ensure that a musical score conforms to particular constraints. For example, the musical score application may flag, or automatically adjust, certain musical portions which are dissimilar from a musical style indicated by a composer. In this example, the composer may indicate that the composer is creating a musical score for a blues song. The musical score application may therefore flag certain portions of a musical score as not conforming to characteristics of blues songs. In some embodiments, the musical score application may automatically adjust these flagged portions. As an example, the musical score application may adjust musical notes such that a blues scale is utilized. As another example, the application may adjust a tempo associated with the musical score.

Thus, the musical score application may advantageously present opportunistic information to the composer. For example, as the composer is creating a musical score, the application may present (e.g., in substantially real-time) recommended musical portions to reduce the time until creation of the musical score. As another example, the music composition application may flag certain portions as requiring updates due to violation of certain musical style constraints. Similarly, the music composition application may flag certain portions as being similar to pre-existing songs or musical works. In this way, the application may serve as an efficient front-end into deep-reaching musical knowledge. Due to the real-time nature of the application, the composer may quickly view, and incorporate, any of the recommendations or adjustments being made or proposed by the application. While the description herein focuses on substantially real-time updating of a musical score, it may be appreciated that optionally a user may provide (e.g., upload) a created musical score. The user may then receive an analyzed version of the musical score according to the techniques described herein. For example, the musical score may be adjusted according to constraints.

The techniques described herein therefore improve upon the functioning of prior music composition software. Prior music composition software enabled a composer to specify bare musical information. For example, the composer may specify musical notes, a tempo, key changes, and so on. However, this music composition software was unable to flag portions of the specified music as failing to conform to specified constraints. Additionally, the music composition software was unable to recommend musical notes, phrases, and so on, for inclusion in a musical score being created. Thus, the techniques described herein enable substantial user efficiency improvements.

The systems, methods, and devices of this disclosure each have several innovative aspects, no single one of which is solely responsible for the all of the desirable attributes disclosed herein.

One embodiment discloses a computer-implemented method, the method enabling creation of a musical score via a user interface, wherein the user interface: receives selection of a particular genre associated with the musical score, the particular genre corresponding to a musical constraint, and the musical constraint indicating one or more learned features associated with the genre; responds to user input indicating musical elements to be included in a representation of the musical score, the musical elements comprising musical notes, wherein the representation updates to present the musical notes; and presents musical score adjustments based on the user input and particular genre, wherein a presented musical score adjustment comprises information identifying portions of the musical score which are determined to deviate from a musical constraint.

Various embodiments of the method may include one, all, or any combination of the following features. Receiving selection of the particular genre comprises receiving selection of one or more artists or one or more songs, wherein a system determines the musical constraint based on analyzing the selected artists or songs. The user interface: presents information identifying a portion of the musical score which deviates from the musical constraint; and automatically adjusts the portion to correspond with the musical constraint, wherein a system determines the adjustment to one or more musical notes included in the portion. The user interface: presents a recommended musical phrase for inclusion in the musical score, the recommended musical phrase being determined based on one or more machine learning models and the particular genre. The user interface presents a plurality of recommended musical phrases, wherein one of the plurality of recommended musical phrases is selected, and wherein the one or more machine learning models are updated based on the selection. The user interface: presents information identifying a portion of the musical score which deviates from the musical constraint; receives user input indicating an adjustment to the constraint; and adjusts one or more portions of the musical score based on the adjusted constraint. The user interface highlights a portion of the musical score as being similar to an existent musical score.

Some aspects feature a computing system comprising one or more processors and non-transitory computer storage media storing instructions that when executed by the one or more processors, cause the one or more processors to perform operations comprising: receiving information identifying initiation of a music composition application, the music composition application being executed via a user device of a user, wherein the received information indicates a genre associated with a musical score being created via the music composition application; determining one or more constraints associated with the genre, wherein the one or more constraints indicate one or more features learned based on analyzing music associated with the genre; receiving musical elements specified by the user via the music composition application, and determining musical score updates based on the musical elements and genre; and providing, to the user device, the determined musical score updates.

Various embodiments of the computing system may include one, all, or any combination of the following features. A musical score update comprises a recommended musical phrase, the recommend musical phrase being generated via one or more machine learning models. The machine learning models comprise a recurrent neural network or a convolutional neural network. A musical score update comprises information identifying a deviation of a portion of the musical score from a constraint. The operations further comprise: determining adjustments to the portion of the musical score based on the constraint, wherein the determined adjustments indicate adjustments to musical notes included in the portion to conform with the constraint; and causing, via the music composition application, updating of the portion based on the determined adjustments. The operations further comprise: receiving, from the user device, information identifying user adjustment of the constraint; analyzing the musical score, and determining one or more adjustments to be made to musical elements included in the musical score based on the adjusted constraint; and causing, via the music composition application, updating of the musical elements based on the determined adjustments. A musical score update comprises information identifying that a portion of the musical score is similar to an existent musical score, wherein the computing system accesses a musical library database and determines one or more measures of similarity between the portion and musical scores included in the musical library database.

Some aspects feature non-transitory computer storage media storing instructions that when executed by a system of one or more processors, cause the one or more processors to perform operations comprising: receiving information identifying initiation of a music composition application, the music composition application being executed via a user device of a user, wherein the received information indicates a genre associated with a musical score being created via the music composition application; determining one or more constraints associated with the genre, wherein the one or more constraints indicate one or more features learned based on analyzing music associated with the genre; receiving musical elements specified by the user via the music composition application, and determining musical score updates based on the musical elements and genre; and providing, to the user device, the determined musical score updates.

Various embodiments of the computer storage media may include one, all, or any combination of the following features. A musical score update comprises a recommended musical phrase, the recommend musical phrase being generated via one or more machine learning models. The machine learning models comprise a recurrent neural network or a convolutional neural network. A musical score update comprises information identifying a deviation of a portion of the musical score from a constraint. The operations further comprise: determining adjustments to the portion of the musical score based on the constraint, wherein the determined adjustments indicate adjustments to musical notes included in the portion to conform with the constraint; and causing, via the music composition application, updating of the portion based on the determined adjustments. A musical score update comprises information identifying that a portion of the musical score is similar to an existent musical score, wherein the computing system accesses a musical library database and determines one or more measures of similarity between the portion and musical scores included in the musical library database.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 5 illustrates an embodiment of computing device according to the present disclosure.

Like reference numbers and designations in the various drawings indicate like elements.

DETAILED DESCRIPTION

Overview

Figure 1A:
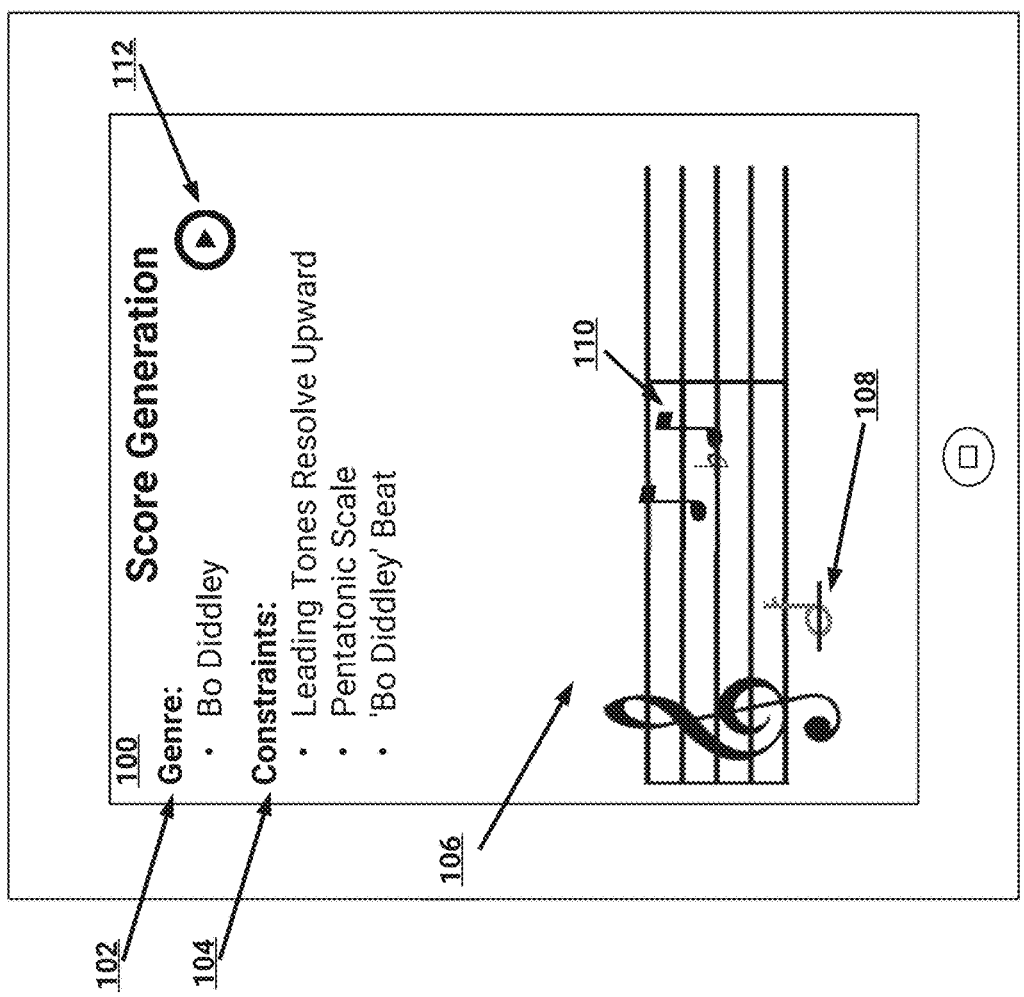
FIG. 1A illustrates an example user interface of a music composition application described herein.

This specification describes, among other things, technical improvements with respect to music editing/composition applications. As will be described, a system (e.g., the musical adjustment and recommendation system 200) may determine musical cue updates associated with a musical score being created by a user via a musical composition application. In this specification, a musical score update may comprise recommendations for, or adjustments to, the musical score. An example recommendation may include recommended musical notes, for example to complete or expound upon musical notes specified by a user. For example, the system may recommend a particular musical phrase be included in the musical score. The musical phrase may represent a measure of music or may represent minutes or hours of music (e.g., generated via machine learning models). An example adjustment may include an adjustment of one or more musical elements (e.g., musical notes, tempo, time signature, and so on) based on particular constraints. Constraints may optionally be based on characteristics or features, as learned by the system or input into the system, of musical styles or genres. For example, one or more musical notes may be adjusted to better conform to a particular genre of music. These recommendations or adjustments may advantageously be determined by the system in real-time (e.g., substantially real-time), such that they may be incorporated into a musical score being actively created by a user.

The system described herein may integrate with a multitude of music composition applications. In some embodiments, the system may represent a cloud-based system of one or more computers or a cloud-based application executing on a system of one or more computers. In these embodiments, the system may receive information from music composition applications. For example, a music composition application may include a plugin or module associated with the system. Thus, in some embodiments the techniques described herein may be rapidly applied to existent music composition applications. As will be described, the system may be in communication with multitudes of music composition applications. Optionally, the system may be associated with a web application. For example, a user may access a particular web page and utilize the web page to create musical scores. In this way, and in some embodiments, the system may enable the technical enhancements as a service for utilization by end-users.

As will be described, a user of a music composition application may initiate preparation of a musical score. For example, the user may cause execution of a music composition application on the user's user device. Example user devices may include a laptop, tablet, mobile device, wearable device, and so on. The user may then optionally select, or otherwise indicate, a musical genre associated with the musical score. The system may utilize the musical score to determine recommended musical phrases, and optionally to ensure that the musical score comports with the musical genre.

As an example, the user may select from among a multitude of musical genres, such as classical, electronic music or a sub-genre thereof, rock music, hip hop, blues, and so on. As another example, the user may indicate that the musical genre is to correspond with one or more selected songs or artists. For example, the user may indicate that the musical genre is to correspond with David Bowie or a combination of artists (e.g., Wire, Gang of Four, and so on). As another example, the user may indicate that the musical genre is to correspond with a particular song, a combination of songs, a combination of a song and an artist, and so on. As will be described, the system may determine constraints associated with the musical genre.

As an example with respect to classical music, the system may access stored information (e.g., rules, guidelines, and so on) associated with classical music. Example constraints may be based on counterpoint rules. In addition, the system may analyze musical scores, audio recordings, and so on, and learn constraints based on the analyses. As an example, the user may indicate that the musical genre is to correspond with songs recorded by a certain artist. In this example, the system may access a database of stored music. The database may include multitudes of sheet music and optionally audio recordings of multitudes of artists. The system may then learn constraints associated with this artist based on the sheet music and/or audio recordings. For example, the system may identify that the artist utilizes certain instruments (e.g., guitar, bass, drums, and so on). As another example, the system may identify particular chord or key changes utilized by the artist.

Optionally, the system may learn constraints utilizing one or more machine learning models. For example, an artificial neural network (e.g., a recurrent neural network) may be utilized to learn common sequences of features. In this example, the system may train the artificial neural network on different aspects of the artist's songs. For example, system may encode certain features, such as chord changes, utilization of leading tones, ands son, as training data. The system may then train an artificial neural network to recognize these features. Another example machine learning model may be a convolutional neural network. In this example, the system may learn information via analyses of audio recordings. Additional machine learning techniques may be leveraged and fall within the disclosure herein. Furthermore, and as will be described, one or more rule-based techniques may be utilized alone, or in combination, with machine learning techniques.

As the user utilizes the music composition application, the system may recommend one or more musical phrases for inclusion in a musical score. The recommended musical phrases may be based, at least in part, on the musical genre. For example, the system may utilize the determined constraints to generate a recommended musical phrase. This recommendation may be based on machine learning techniques, such as a recurrent neural network. The recommendation may further be based on analyses on the musical genre, such as via a suffix tree associated with the musical genre. The system may also indicate that certain user-provided musical phrases are contrary to the determined musical genre. For example, the system may indicate that the musical genre generally does not utilize a particular scale or chord change.

Example User Interfaces

FIGS. 1A-1D describe example user interfaces associated with enhanced musical composition techniques. The user interfaces described below may be presented via different user devices. For example, the user interfaces may be presented via a mobile device (e.g., a smartphone, tablet, wearable device, and so on). As another example, the user interfaces may be presented via a laptop, personal computer, and so on.

With respect to mobile devices, an application may be obtained from an electronic application store (e.g., an 'app') which causes presentation of the user interfaces. For example, the application may render the visual elements illustrated in FIGS. 1A-1D. In some embodiments, the application may determine recommendations or adjustments to a musical score being created via the application. In some embodiments, the application may be in communication with an outside system. An example outside system may include the musical adjustment and recommendation system 200 described in more detail below, with respect to FIG. 2.

In this example, the application may provide information to the outside system. Example provided information may include indications of user input to the application. For example, the user input may identify selections of musical notes, tempo indications, key changes, time signature changes, and/or arbitrary musical composition notation information. As will be described, the application may receive information the outside system. Example received information may include recommendations, or adjustments, to a musical score being created via the application. In this way, the outside system may trigger updates to the user interfaces described herein.

With respect to a laptop, desktop, and so on, the user interface may be associated with music composition software executing on the laptop, desktop, and so on. In some embodiments, the user interfaces described herein may be generated by music composition software associated with a system described herein (e.g., the musical adjustment and recommendation system 200). In some embodiments, the user interfaces may be associated with a web application being accessed by a laptop, desktop, and so on. For example, a user may utilize a browser to access a particular web page. The browser may render the user interfaces described herein, and present the rendered user interfaces to a user. User input may be provided via the browser to a system associated with the web application. In response, the system may cause updating of the user interfaces.

Optionally, the features described herein may be enabled via modules or plugins associated with music composition software. As an example, a user may cause inclusion of a particular plugin into the user's preferred music composition software. This plugin may communicate with a system described herein (e.g., the musical adjustment and recommendation system 200). Additionally, the plugin may cause updates to the user interfaces described herein.

The user interfaces described herein may respond to different types of user input. Example types of user input may include touch-based input, voice-based input, keyboard and mouse input, and so on. With respect to a tablet, in some embodiments the user interfaces may respond to smart pen or smart pencil based input. As an example, a user may sketch musical symbols, such as clefs, notes, rests, breaks, accidentals, key signatures, time signatures, dynamics, articulation marks, and so on.

FIG. 1A illustrates an example user interface 100 of a music composition application described herein. As described above, the user interface 100 may be utilized to compose a musical score. In the example of FIG. 1A, the user interface 100 includes a musical score 106 being created by a user of the user interface 100. The musical score 106 may be crated utilizing a musical score editing user interface. For example, the user may select from among types of musical notes (e.g., a half note 108, a quarter note 110, and so on) via an editing user interface. As another example, the user may select particular instruments to play portions of the musical notes or may have different musical scores for respective instruments. It may be appreciated that multitudes of such editing user interfaces may be leveraged and fall within the scope of the disclosure herein.

User interface 100 identifies a genre 102 selected by the user. As described above, the user may indicate a particular musical style (referred to herein as a 'genre') associated with the musical score 106. As will be described below, the user interface 100 may ensure that the musical score 106 comports with the genre 102. For example, the user may be creating a musical score in a baroque classical style. In this example, if the user specifies a sequence of musical notes which deviate from the baroque classical style, then the user interface 100 may update to reflect this deviation.

The genre 102, as illustrated in the example of FIG. 1A, indicates 'Bo Diddley'. Advantageously, instead of the user being required to select from among broad established styles, the user may select specific artists or songs. Thus, the user may avoid selecting 'rock n roll', or 'early rock n roll', and instead more closely adhere to the stylistic preference the user is trying to achieve. The user may specify one or more artists or songs via the user interface 100. For example, the user may provide user input identifying 'Bo Diddley'. As will be described, the musical adjustment and recommendation system 200 may access stored musical information and determine one or more constraints associated with the genre 102.

To select a particular artist, or one or more particular songs, the user interface 100 may optionally integrate with a music streaming service. For example, the user of the user interface 100 may access a music streaming service and select 'Bo Diddley' via the music streaming service. This selection may be routed to the user interface 100. It may be appreciated that music streaming services may have application programming interfaces (APIs) associated with routing selections of artists or songs. For example, a music streaming service may enable the routing of a selected song to a wireless speaker via a same local network. The user interface 100 may similarly receive selections of artists or songs via a local network. As another example, the user interface 100 may subscribe to updates from the music streaming services via the APIs. In this example, the user interface 100 may subscribe to selections of the user via the user's music streaming services. In this way, the user may simply open up a music streaming service application and rapidly select particular artists or songs whose style the user intends to conform with.

Upon selection of a genre 102, the user interface 100 may update to present constraints 104 associated with the genre 102. These constraints 104 may be based on rules stored by the musical adjustment and recommendation system 200. For example, certain musical constraints may be extracted from constraints known to exist for different genres. As an example, a user may select the genre 'reggae'. This genre may have certain stylistic commonalities, such as the counterpoint between bass and drum downbeat, offbeat guitar rhythm, and so on. These stylistic commonalities may be stored by the musical adjustment and recommendation system 200.

The constraints 104 may also be learned by the musical adjustment and recommendation system 200. As will be described, the musical adjustment and recommendation system 200 may access one or more databases storing multitudes of audio files and/or musical scores. The musical adjustment and recommendation system 200 may learn features associated with the audio files and/or musical scores. These features may be aggregated across songs of a same genre, songs of a same artist, and so on. In this way, the musical adjustment and recommendation system 200 may learn that a first artist (e.g., Bach) utilizes certain musical elements or styles (e.g., four-part harmonies). Additionally, the musical adjustment and recommendation system 200 may learn that the first artist does not utilize other musical elements (e.g., power chords).

The constraints 104 may be stored as one or more rules which are to be enforced by the system 200. Optionally, the constraints 104 may be captured according to a learned encoding which is provided to a machine learning model. In this example, the musical adjustment and recommendation system 200 may therefore generate, or access, an encoding (e.g., an encoded vector, matrix, tensor, and so on) representing the selected genre 102.

The user interface 100 includes information identifying the constraints 104 associated with the genre 102. The user interface 100 may receive textual descriptions of one or more constraints associated with the genre 102. For example, the musical adjustment and recommendation system 200 may generate a textual description for each of the determined constraints. In some embodiments, a textual description of a constraint may be crowd-sourced. For example, users of the user interface 100 may update the textual description to make the corresponding constraint more evident.

In the illustrated example, three constraints are identified 104. These constraints are included for illustrative purposes, and are not be considered as characterizing the indicated genre 102. A first constraint, 'leading tones resolve upwards' may thus inform the user that when creating the musical score 106 the user is to resolve leading tones upwards. A second constraint, 'pentatonic scale', indicates that the user is to select musical notes from the pentatonic scale. A third constraint, 'Bo Diddley beat', indicates that the musical score is to conform to the Bo Diddley beat (e.g., a 3-2 clave rhythm).

The above-described third constraint may optionally represent a crowd-sourced constraint. For example, users may have specified that the particular beat is known as a 'Bo Diddley beat'. Upon a threshold number of users specifying same, or similar, text, the musical adjustment and recommendation system 200 may designate the name as the constraint. Optionally, the third constraint may be obtained automatically by the musical adjustment and recommendation system 200. For example, the system 200 may access search information associated with the genre 102. Utilizing natural language process or understanding techniques, the system 200 may then associate the constraint name 'Bo Diddley Beat' with its corresponding musical features (e.g., a 3-2 rhythm).

In some embodiments, the user of the user interface 100 may cause an output associated with a constraint to be presented or provided. For example, the user may select 'pentatonic scale' via user input provided to the user interface 100. In this example, the user interface 100 may update to present information describing the constraint. Example information may include a definition of a pentatonic scale. Additionally, the user interface 100 may update the musical score 106 to graphically illustrate the musical notes included in the pentatonic scale. Similarly, if the user selects 'Bo Diddley beat', the user interface 100 may update to present a definition of the beat. Additionally, examples of musical elements which conform to this beat may be presented in the musical score 106. In some embodiments, the user interface 100 may present auditory examples of a selected constraint. Thus, the user may quickly ascertain a meaning associated with a constraint.

The constraints may optionally be overridden by the user. For example, the user may prefer to remove the 'pentatonic scale as a constraint'. Additionally, the user may set certain constraints at varying constraint levels. As an example, a first constraint level may indicate that any deviation from a first constraint will cause the user interface 100 to alert the user or modify the musical score 106 to conform with the first constraint. As another example, a second constraint level may indicate that deviations from a second constraint may be flagged for user review. In this example, as the user specifies musical elements which deviate from the second constraint may be flagged (e.g., in real-time) for user review. As another example, a third constraint level may indicate that deviations from a third constraint may logged for later review by the user.

Optionally, the user may designate, or access templates of, specific rules associated with constraints. These rules may be utilized in the user interface 100 to identify a response to take based on a deviation from a constraint. An example rule may chain, or otherwise combine, other rules. For example, the user may indicate a Boolean expression associated with certain rules. An example Boolean expression may include a deviation from a particular constraint coupled with a deviation from a different constraint. The expression may indicate that these deviations need to occur in a same measure, prior to the user interface 100 updating to flag the deviations or to automatically adjust the musical elements.

As described above, the user may provide user input to specify musical elements in a musical score. Advantageously, as the user provides user input the user interface 100 may update to perform opportunistic analyses of the specified musical elements. As described above, a first example opportunistic analysis may include highlighting, or otherwise flagging, specific musical elements which deviate from a constraint. For example, if the user specifies musical notes outside of a pentatonic scale, then the user interface 100 may update to identify these musical notes. A second opportunistic analysis may include automatic adjustment of musical elements. With respect to the example of a pentatonic scale, the user interface 100 may automatically adjust musical notes upwards, or downwards, to correspond with the pentatonic scale. Optionally, the user interface 100 may enable the updating of a constraint or selection of a new constraint. In response to an update, the user interface 100 may automatically adjust prior specified musical elements to conform with the updated or new constraint. A third opportunistic analysis may include the user interface 100 identifying portions of the musical score 106 which are similar to existing music. For example, the user interface 100 may indicate that a portion of the musical score 106 sounds similar to a particular 'Beatles' song.

The user interface 100 further includes a selectable option 112 associated with playing the musical score 106. In response to selection of the selectable option 112, the user interface 100 may cause an auditory representation of the musical score to be played. Optionally, this auditory representation may be generated via Musical Instrument Digital Interface (MIDI) techniques. In some embodiments, the auditory representation may be generated via simulation of instruments. For example, the musical adjustment and recommendation system 200 may model the physical acoustics of, or electronic sound generated by, each instrument designated in the musical score 106.

Advantageously, user preferences regarding playing of the musical score 106 may be learned. Thus, the user interface 100 may be utilized to learn times at which the user prefers to hear the musical score 106. Optionally, the musical adjustment and recommendation system 200 may cause automatic playing of the musical score 106 based on existence of certain events. For example, the musical adjustment and recommendation system 200 may learn that the user plays the musical score 106 after specifying one or more measures or musical phrases. As another example, the musical adjustment and recommendation system 200 may learn to play the musical score 106 if the user provides no user input for a threshold amount of time after specifying measures or musical phrases.

Figure 1B:
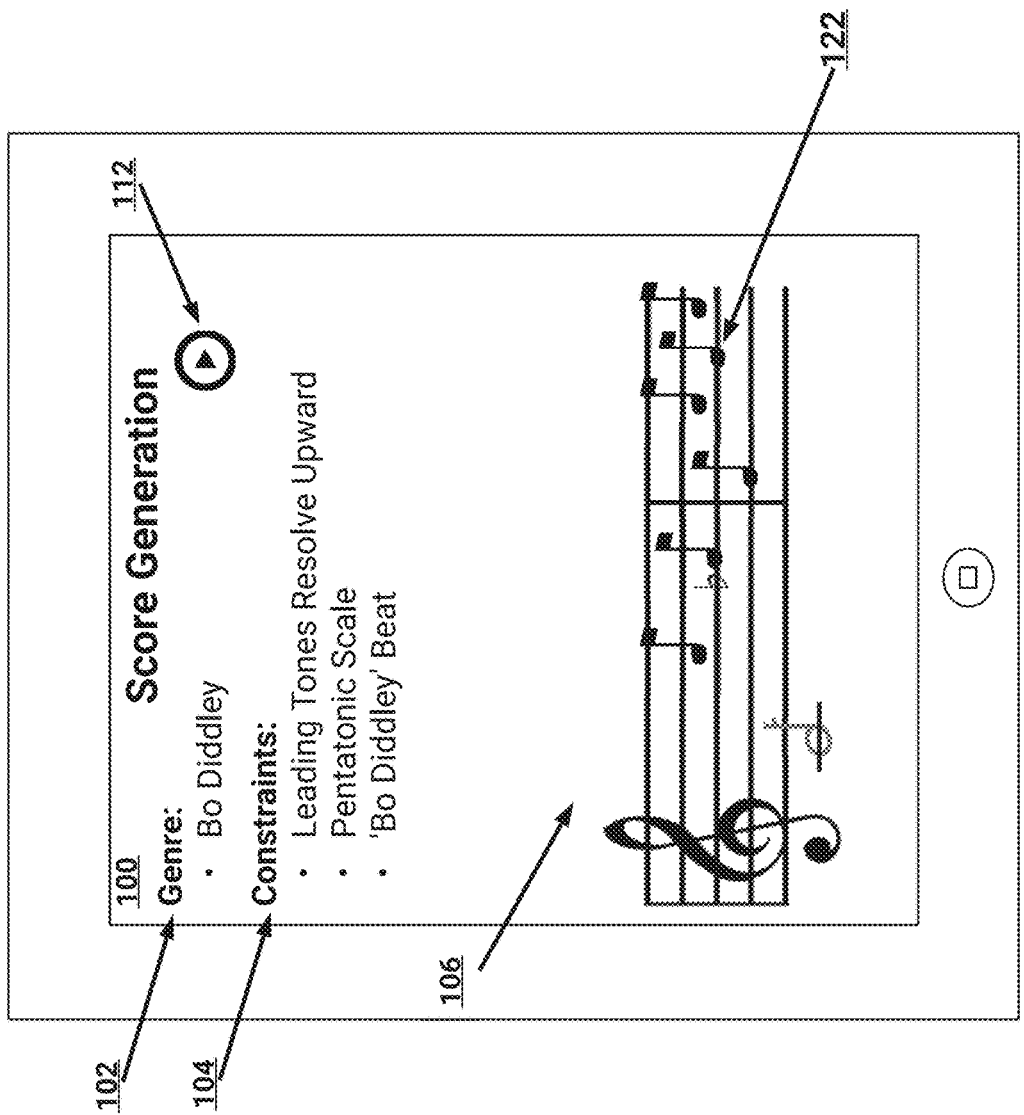
FIG. 1B illustrates a user of the user interface causing inclusion of musical notes into a musical score.

FIG. 1B illustrates a user of the user interface 100 causing inclusion of musical notes into a musical score 106. As described above, the user may utilize an editing user interface to select musical elements (e.g., notes, temp changes, and so on). In the example of FIG. 1B, the user has specified example notes, with a particular note 122 being outside of the pentatonic scale for the key of 'C'. Thus, this particular note 122 has deviated from one of the constraints 104 which identifies that musical notes are to be included in the 'pentatonic scale'.

Figure 1C:
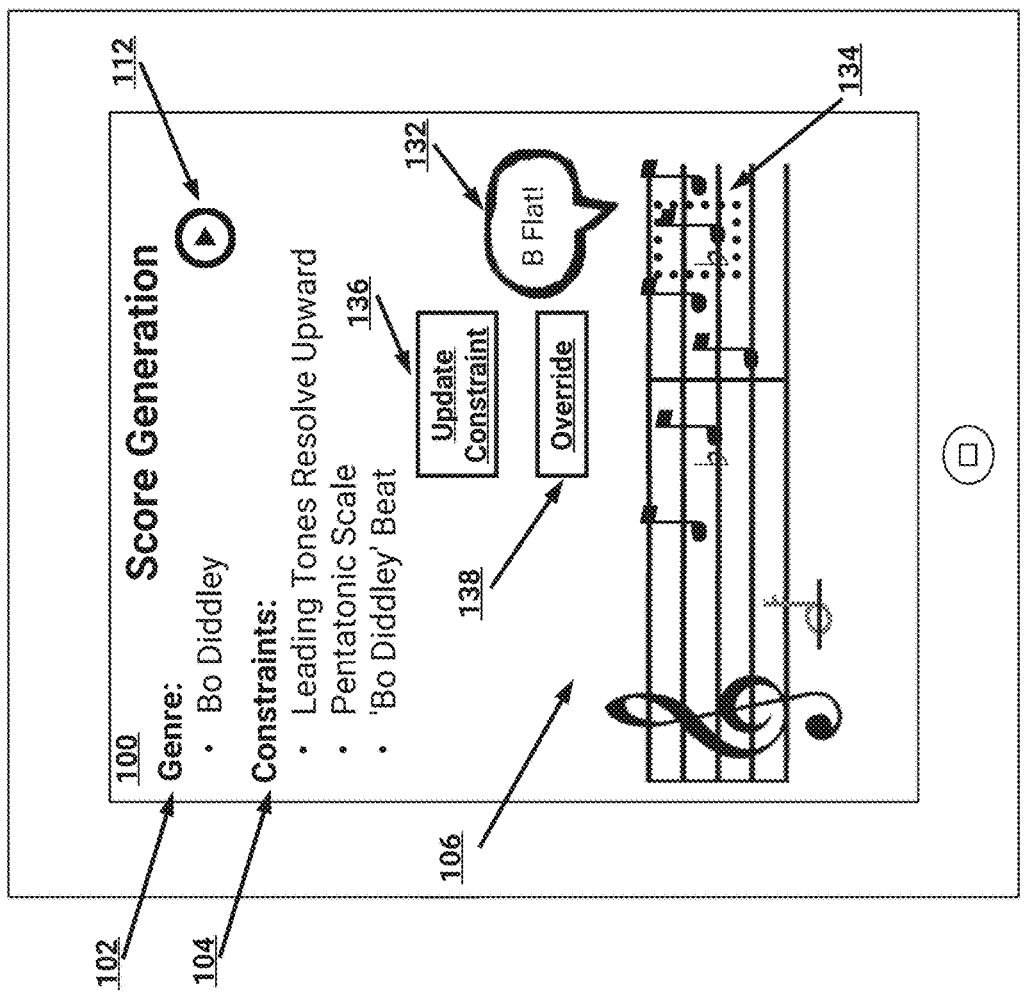
FIG. 1C illustrates the user interface presenting an adjustment to the musical score based on one or more constraints.

FIG. 1C illustrates the user interface 100 presenting an adjustment to the musical score 106 based on one or more constraints. In the example of FIG. 1B, the user has provided a particular note 122 which is outside of the pentatonic scale (e.g., for the key of 'C'). In the illustrated example of FIG. 1C, the user interface 100 has updated to indicate a deviation from the constraint. For example, the user interface identifies that it has changed the particular note 122 from 'B' into 'B flat' 132. Thus, the user interface 100 has automatically updated the particular note 122 to conform with the constraints 104. Advantageously, the user interface 100 has updated to highlight 134 the automatically adjusted musical note. It may be appreciated that additional highlighting 134, or flagging, of the musical note may be utilized.

In addition to automatically adjusting the musical note, the user interface 100 includes selectable options 136-138 associated with the updating. Selectable option 136 enables the user to update the constraint. In the example of FIG. 1B, the constraint at issue is the utilization of the 'pentatonic scale'. Thus, the user may update the cause the removal of this constraint. The user may also adjust this constraint. For example, the user may indicate that the particular note 122 (e.g., 'B') is acceptable for use in the musical score. As another example, the user may indicate that the deviation from the constraint is acceptable for a particular pattern of musical notes which led to the particular note 122.

In response to updating or adjusting of a constraint, the user interface 100 may update prior musical elements included in the musical score 106. For example, the updated constraint may indicate an updating of a time signatures or tempo. Thus, the user interface 100 may update musical elements 106 which are affected by the updated time signature or tempo. Optionally, the user interface 100 may flag, or otherwise highlight, portions of musical score 106 affected by the updates.

Selectable option 138 may be utilized to override the automatic adjustment to 'B flat' 134. For example, the user may provide user input to this selectable option 138, and the user interface 100 may update to return 'B flat' 134 to 'B' 122. Optionally, a user preference may be automatically learned (e.g., by the musical adjustment and recommendation system 200). As an example, the musical adjustment and recommendation system 200 may identify that the user prefers utilizing the particular note 122. This identification may be based on a number of times the user has overridden a particular a constraint. Thus, even if the user does not update the constraint via selectable option 136, the musical adjustment and recommendation system 200 may learn that the user may prefer the constraint be updated.

In some embodiments, the musical adjustment and recommendation system 200 may aggregate responses across multitudes of users. For example, the musical adjustment and recommendation system 200 may determine that a particular constraint is generally not followed. In this example, the musical adjustment and recommendation system 200 may determine that the constraint does not correspond with an associated genre 102. The system 200 may therefore determine to remove this constraint.

As another example, the musical adjustment and recommendation system 200 may adjust a constraint level associated with a particular constraint. For example, the musical adjustment and recommendation system 200 may identify that deviations from a particular constraint are generally ignored. However, the musical adjustment and recommendation system 200 may determine that these deviations are later reviewed by end-users. Thus, the musical adjustment and recommendation system 200 may set the constraint level such that deviations are logged but musical elements are not automatically adjusted.

Figure 1D:
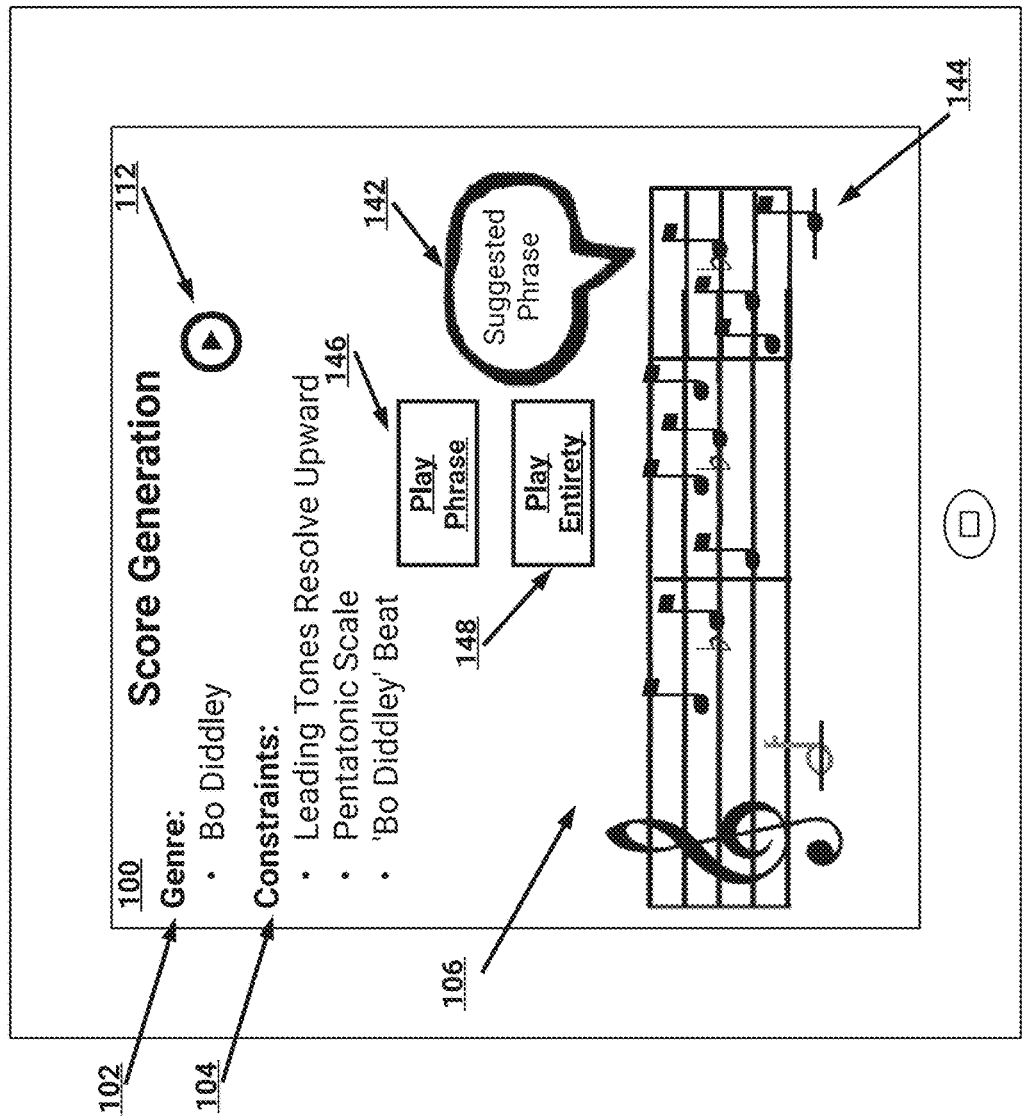
FIG. 1D illustrates the user interface presenting a recommended musical phrase for inclusion in the musical score.

FIG. 1D illustrates the user interface 100 presenting a recommended musical phrase for inclusion in the musical score 106. The user interface 100 may optionally present musical phrases for inclusion in the musical score 106. For example, the musical adjustment and recommendation system 200 may utilize machine learning techniques to generate a musical phrase. The musical phrase, as described herein, may represent a portion of music. For example, a particular measure of music may be generated. As another example, multiple measures may be generated. As another example, a new melody line may be generated. In this example, the user may confirm the new melody line and one or more musical phrases or portions may be generated based on the melody line. As illustrated, the user interface 100 has updated to reflect a recommended musical phrase 144.

The recommended musical phrase 144 may be generated based on the specified genre 102. Additionally, the recommended musical phrase 144 may be generated based on prior included musical elements in the musical score 106. It may be appreciated that example machine learning techniques, such as a recurrent neural network, may utilize prior input to generate an output sequence. Thus, and as an example, the musical adjustment and recommendation system 200 may utilize one or more recurrent neural networks to generate the musical phrase 144. In some embodiments, a convolutional neural network, such as with one or more WaveNet layers, may be leveraged to generate audio corresponding to a recommended musical phrase 144. The musical adjustment and recommendation system 200 may identify the musical notes included in the audio, and update the musical score with the musical notes.

Optionally, the recommended musical phrase 144 may be generated in accordance with a designated emotion or feeling to be achieved by the musical score 106 or a portion thereof. For example, the user of the user interface 100 may indicate that the musical score, or a portion thereof, is to achieve a feeling of happiness. The musical adjustment and recommendation system 200 may learn a meaning associated with a specified emotion. For example, machine learning techniques may be leveraged by the system 200. In this example, labeled training data may be ingested by the system 200. As an example, the labeled training data may indicate labeled emotions and corresponding musical phrases, passages, musical scores, and so on. Thus, the recommended musical phrase 144 may comport with a designated emotion. With respect to a designed emotion of sadness, the recommended phrase 144 may be associated with a certain musical tempo (e.g., slower), certain notes, and so on.

The user interface 100 includes selectable options 146-148 associated with the recommended musical phrases 144. A first selectable option 146 enables the user to hear the recommended phrase 144. As described above, musical score 106, or a portion thereof, may be played utilizing, as an example, MIDI techniques. Thus, the user may request that the recommended musical phrase 144 be played. The user may also highlight a portion of the musical score 106. This highlighting may cause the portion to be played. Another selectable option 148 may enable the user to rapidly request that the entirety of the musical score 106 be played.

In some embodiments, the user interface 100 may present multiple recommended musical phrases. The user may then select from among the recommended musical phrases. As the user makes selections, the musical adjustment and recommendation system 200 may learn the user's preferences. For example, the musical adjustment and recommendation system 200 may update one or more machine learning models based on the selections. In this example, the musical adjustment and recommendation system 200 may utilize, as an example, backpropagation techniques in which the user's selections are optionally weighted highly (e.g., greater than during normal training). In this way, the musical adjustment and recommendation system 200 may learn the user's particular musical style and/or quirks.

Example Block Diagrams

Figure 2:
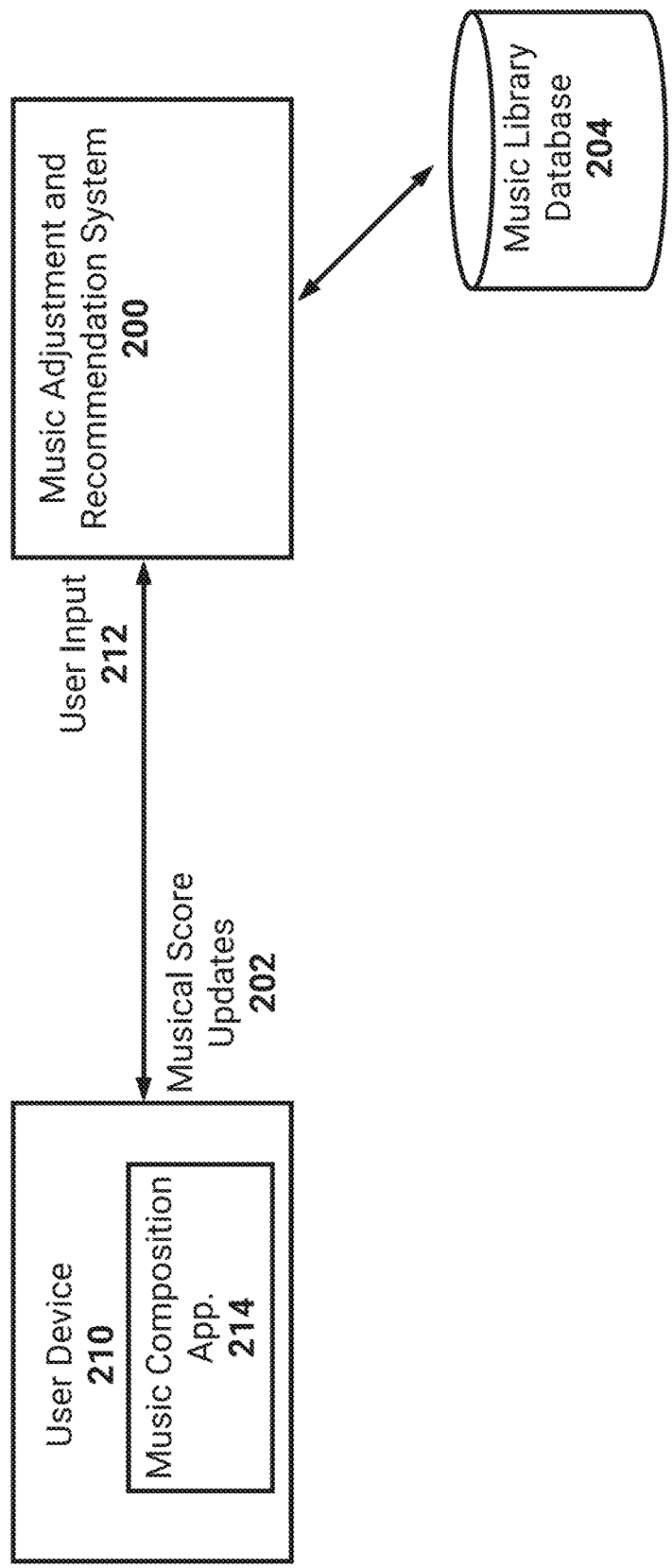
FIG. 2 is a block diagram of an example musical adjustment and recommendation system.

FIG. 2 is a block diagram of an example musical adjustment and recommendation system 200. As described above, the musical adjustment and recommendation system 200 may enable recommendations of, or adjustments to, a musical score being created by a user. Examples of a user utilizing a user interface to create a musical score are described above, with respect to FIGS. 1A-1D.

The musical adjustment and recommendation system 200 may be a system of one or more computers, one or more virtual machines executing on a system of one or more computers, and so on. In some embodiments, the musical adjustment and recommendation system 200 may be in communication with multitudes of user devices. For example, and as described above, the musical adjustment and recommendation system 200 may be leveraged to provide musical score updates 202 to each of the user devices. Thus, the musical adjustment and recommendation system 200 may, in some embodiments, represent a musical score updating service.

As described in FIGS. 1A-1D, the user device 210 may utilize a music composition application 214 to create a musical score. The music composition application may integrate with the musical adjustment and recommendation system 200. For example, a plugin or module associated with the musical adjustment and recommendation system 200 may be included in the music composition application. Optionally, the musical adjustment and recommendation system 200 may be associated with, or implement, a web application to enable music composition.

Thus, a user of the user device 210 may create a musical score via input provided to the user's user device 210. The user input 210 may be provided by the user device 210 to the musical adjustment and recommendation system 200. User input 210 may represent specifications of particular musical elements, such as musical notes, tempo changes, and so on. User input 210 may optionally represent touch or voice based input. For example, in embodiments in which the musical adjustment and recommendation system 200 is associated with a web application, the musical adjustment and recommendation system 200 may process the user input 210. The musical adjustment and recommendation system 200 may therefore identify that the user input corresponds to specific selections of musical elements.

As illustrated, the musical adjustment and recommendation system 200 is in communication, or maintains, a music library database 204. The music library database 204 may include multitudes of existent musical scores and/or audio files associated with multitudes of songs. Additionally, the music library database 204 may include multitudes of rules or constraints associated with different genres. As described above, the musical adjustment and recommendation system 200 may analyze musical scores, audio files, and so on, to determine constraints associated with a user-specified genre. Optionally, the constraints may be based on known rules or guidelines associated with different genres. For example, classical music may have existing rules of counterpoint. As another example, certain styles of jazz may have known guidelines (e.g., Dixieland jazz may have certain commonly followed characteristics). The determined constrains may be encoded as decision trees, random forests, suffix trees, and/or other symbolic approaches. The determined constraints may be also be enforced via machine learning techniques.

In addition to utilizing known rules or guidelines, the musical adjustment and recommendation system 200 may extract constraints based on analyses of musical scores or audio files. For example, the musical adjustment and recommendation system 200 may generate suffix trees for each of multiple genres of music. These suffix trees may represent common characteristics among the genres. As another example, the musical adjustment and recommendation system 200 may learn patterns, or outliers, with respect to musical scores associated with a same genre.

Optionally, the user of the user device 210 may select a particular song, or less than a threshold number of songs or artists. In some embodiments, the musical adjustment and recommendation system 200 may utilize supplemental information to determine constraints. For example, the user may indicate that the genre is to be set as 'The Modern Lovers'. In this example, the musical adjustment and recommendation system 200 may determine that this artist released a single album. Thus, to supplement information for this genre, the musical adjustment and recommendation system 200 may utilize information associated with related artists or songs. For example, the musical adjustment and recommendation system 200 may utilize information from the Velvet Underground, and so on. In this way, the musical adjustment and recommendation system 200 may determine constraints for the genre based on the user's selection and also additional, related, information.

Based on determined constraints, the musical adjustment and recommendation system 200 may determine musical score updates 202. As described in FIGS. 1A-1D, the musical score updates may reflect recommended musical phrases or adjustments to user-specified musical elements. These recommendations or adjustments may be determined utilizing example machine learning techniques, such as deep neural networks. Optionally, these recommendations may be determined utilizing decision trees, suffix trees, and so on.

Additionally, an example musical score update 202 may include an indication that a portion of the user's musical score is similar to that of existent music. The musical adjustment and recommendation system 200 may determine one or more measures of difference between the user's musical score and existing music. Example measures may be based on a distance function, or a similarity metric. Additionally, the musical adjustment and recommendation system 200 may generate audio corresponding to the user's musical score and existing music. The musical adjustment and recommendation system 200 may then determine measures of similarity between the generated audio. In this way, the musical adjustment and recommendation system 200 may identify that a portion of the user's musical score is similar to that of a particular song.

Optionally, the musical adjustment and recommendation system 200 may identify that the particular song utilized elements from prior songs (e.g., user-created musical scores or audio, or professionally created musical scores or audio). These prior songs may be determined to have been written prior to a certain date, such that they are in the public domain. Thus, while the musical adjustment and recommendation system 200 may identify the similarity, the musical adjustment and recommendation system 200 may further indicate that the user may utilize the musical portion.

Example Flowcharts

Figure 3:
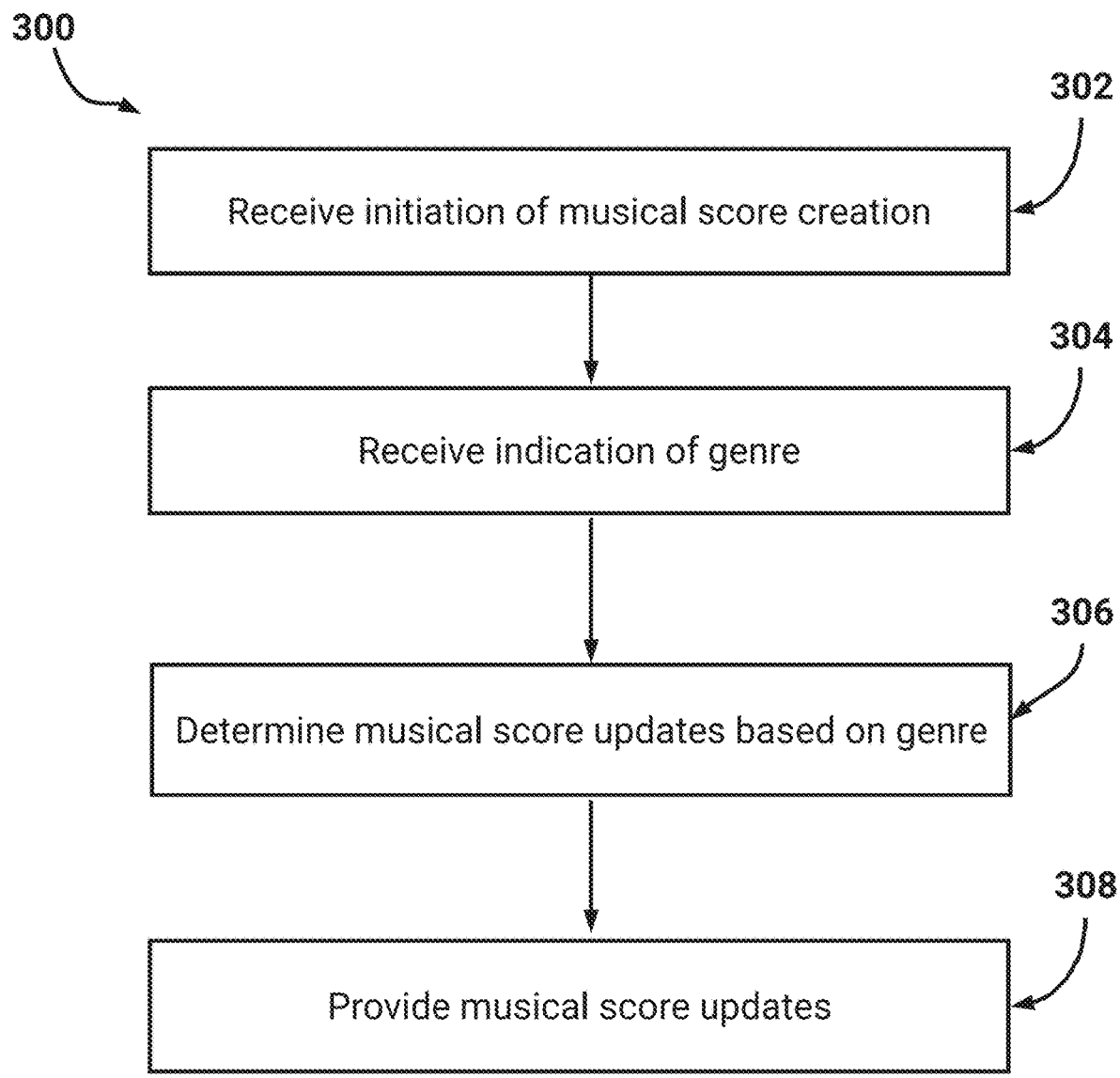
FIG. 3 is a flowchart of an example process for determining musical score updates.

FIG. 3 is a flowchart of an example process 300 for determining musical score updates. For convenience, the process 300 will be described as being determined by a system of one or more computers (e.g., the musical adjustment and recommendation system 200).

At block 302, the system receives initiation of musical score creation. As described in FIG. 1A, a user may access a music composition application. The system may receive information from the music composition application, such as user input indicating selection of musical notes.

At block 304, the system receives an indication of a genre. The user may select one or more songs, artists, which are to represent the genre corresponding to a musical score being created. The user may also select from among existing genres, such as classical or a sub-genre thereof, jazz or a sub-genre thereof, and so on. The system may then determine constraints associated with the genre. For example, the genre may correspond to Baroque classical music. In this example, the system may determine constraints associated with Bach, Handel, and so on.

At block 306, the system determines musical score updates. The system receives user-specified musical elements, such as musical notes, key changes, chord changes, and so on. The system may then utilize the genre to determine updates to be provided to the user. Example musical score updates are described above, with respect to FIGS. 1A-2. With respect to the example of Baroque classical music, the system may, for example, recommend a musical phrase for inclusion. This musical phrase may optionally be obtained from a piece by Handel, or may optionally be generated in accordance with Handel's style.

At block 308, the system provides the musical score updates to the user. The system may cause the user interface presented on the user's user device to update to reflect the musical score updates.

Figure 4:
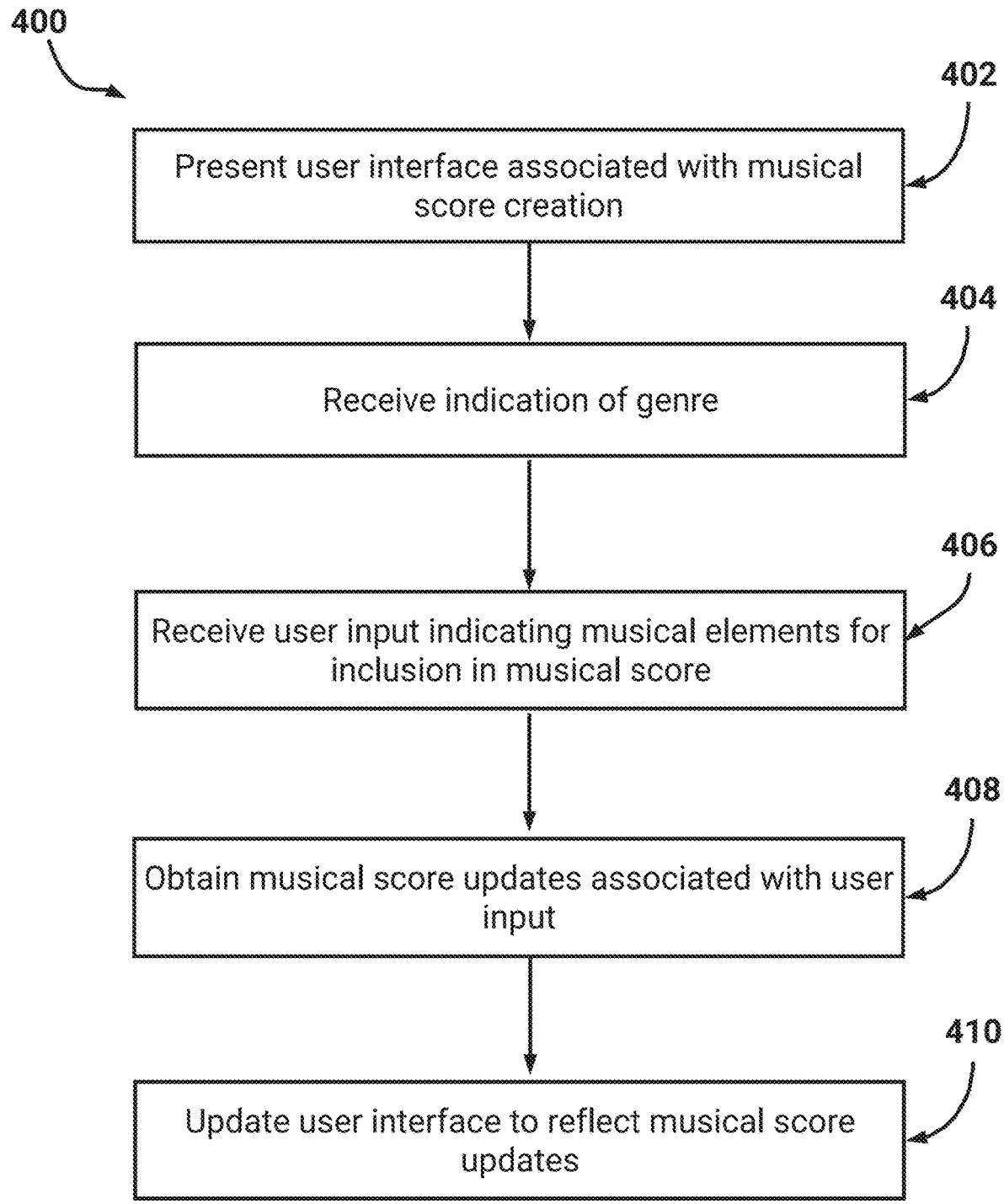
FIG. 4 is a flowchart of an example process for presenting musical score updates.

FIG. 4 is a flowchart of an example process 400 for presenting musical score updates. For convenience, the process 400 will be described as being performed by a user device of one or more processors (e.g., the user device 210). Optionally, the process 400 may be performed in part by the musical adjustment and recommendation system 200. For example, the user interface described herein may be presented on a user device, and updates to the user device may be determined by the musical adjustment and recommendation system 200.

At block 402, the user device presents a user interface associated with musical score creation. Examples of a user interface are described above, with respect to FIGS. 1A-1D. The user interface may include a portion associated with creating a musical score.

At block 404, the user device receives an indication of genre. As described in FIGS. 1A-3, a user may select a particular genre. The genre may correspond to a collection of songs, artists, or a selection of one or more pre-existing genres.

At block 406, the user device receives user input indicating musical elements for inclusion in a musical score. As described herein, the user of the user device may specify musical elements associated with creating a musical score. For example, the user may specify musical notes, tempo, key changes, chords, dynamics, and so on.

At block 408, the user device obtains musical score updates. A system described herein, for example the music adjustment and recommendation system 200, may determine recommendations or adjustments to the user's musical score.

At block 410, the user device updates the user interface. As described in FIGS. 1A-1D, the user device may present the musical score updates.

Example Computing System

FIG. 5 illustrates an embodiment of computing device 510 according to the present disclosure. Other variations of the computing device 510 may be substituted for the examples explicitly presented herein, such as removing or adding components to the computing device 510. The computing device 510 may include a game device, a smart phone, a tablet, a personal computer, a laptop, a smart television, a car console display, a server, and the like. The computing device 510 may also be distributed across multiple geographical locations. For example, the computing device 510 may be a cluster of cloud-based servers.

As shown, the computing device 510 includes a processing unit 520 that interacts with other components of the computing device 510 and also external components to computing device 510. A game media reader 522 is included that communicates with game media 512. The game media reader 522 may be an optical disc reader capable of reading optical discs, such as CD-ROMs or DVDs, or any other type of reader that can receive and read data from game media 512. One or more of the computing devices may be used to implement one or more of the systems disclosed herein.

Computing device 510 may include a separate graphics processor 524. In some cases, the graphics processor 524 may be built into the processing unit 520. In some such cases, the graphics processor 524 may share Random Access Memory (RAM) with the processing unit 520. Alternatively or additionally, the computing device 510 may include a discrete graphics processor 524 that is separate from the processing unit 520. In some such cases, the graphics processor 524 may have separate RAM from the processing unit 520. Computing device 510 might be a handheld game application device, a dedicated game console computing system, a general-purpose laptop or desktop computer, a smart phone, a tablet, a car console, or other suitable system.

Computing device 510 also includes various components for enabling input/output, such as an I/O 532, a user I/O 534, a display I/O 536, and a network I/O 538. I/O 532 interacts with storage element 540 and, through a device 542, removable storage media 544 in order to provide storage for computing device 510. Processing unit 520 can communicate through I/O 532 to store data, such as game state data and any shared data files. In addition to storage 540 and removable storage media 544, computing device 510 is also shown including ROM (Read-Only Memory) 546 and RAM 548. RAM 548 may be used for data that is accessed frequently, such as when a video game is being played.

User I/O 534 is used to send and receive commands between processing unit 520 and user devices, such as game controllers. In some embodiments, the user I/O 534 can include a touchscreen input. The touchscreen can be capacitive touchscreen, a resistive touchscreen, or other type of touchscreen technology that is configured to receive user input through tactile inputs from the player. Display I/O 536 provides input/output functions that are used to display images from the game being played. Network I/O 538 is used for input/output functions for a network. Network I/O 538 may be used during execution of a game, such as when a game is being played online or being accessed online, application of fraud detection, and/or generation of a fraud detection model.

Display output signals produced by display I/O 536 comprise signals for displaying visual content produced by computing device 510 on a display device, such as graphics, user interfaces, video, and/or other visual content. Computing device 510 may comprise one or more integrated displays configured to receive display output signals produced by display I/O 536. According to some embodiments, display output signals produced by display I/O 536 may also be output to one or more display devices external to computing device 510.

The computing device 510 can also include other features that may be used with a video game, such as a clock 550, flash memory 552, and other components. An audio/video player 556 might also be used to play a video sequence, such as a movie. It should be understood that other components may be provided in computing device 510 and that a person skilled in the art will appreciate other variations of computing device 510.

Program code can be stored in ROM 546, RAM 548 or storage 540 (which might comprise a hard disk, other magnetic storage, optical storage, other non-volatile storage or a combination or variation of these). Part of the program code can be stored in ROM that is programmable (ROM, PROM, EPROM, EEPROM, and so forth), and part of the program code can be stored in storage 540, and/or on removable media such as game media 512 (which can be a CD-ROM, cartridge, memory chip or the like, or obtained over a network or other electronic channel as needed). In general, program code can be found embodied in a tangible non-transitory signal-bearing medium.

Random access memory (RAM) 548 (and possibly other storage) is usable to store variables and other game and processor data as needed. RAM 548 is used and holds data that is generated during the execution of an application and portions thereof might also be reserved for frame buffers, application state information, and/or other data needed or usable for interpreting user input and generating display outputs. Generally, RAM 548 is volatile storage and data stored within RAM 548 may be lost when the computing device 510 is turned off or loses power.

As computing device 510 reads game media 512 and provides an application, information may be read from game media 512 and stored in a memory device, such as RAM 548. Additionally, data from storage 540, ROM 546, servers accessed via a network (not shown), or removable storage media 544 may be read and loaded into RAM 548. Although data is described as being found in RAM 548, it will be understood that data does not have to be stored in RAM 548 and may be stored in other memory accessible to processing unit 520 or distributed among several media, such as game media 512 and storage 540.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Additional Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method, the method enabling creation of a musical score via a user interface, wherein the user interface:
   receives selection of a particular genre associated with the musical score, the particular genre corresponding to a musical constraint, and the musical constraint indicating one or more learned features associated with the genre, wherein receiving selection of the particular genre comprises receiving selection of one or more artists or one or more songs, wherein a system determines the musical constraint based on analyzing the selected artists or songs;
   responds to user input indicating musical elements to be included in a representation of the musical score, the musical elements comprising musical notes, wherein the representation updates to present the musical notes; and
   presents musical score adjustments based on the user input and particular genre, wherein a presented musical score adjustment comprises information identifying portions of the musical score which are determined to deviate from a musical constraint, and wherein for a particular portion, the user interface;
   presents information identifying the particular portion of the musical score which deviates from the musical constraint, and
   automatically adjusts the particular portion to correspond with the musical constraint, wherein the system determines the adjustment to one or more musical notes included in the particular portion.

2. The computer-implemented method of claim 1, wherein receiving selection of the particular genre comprises receiving selection of one or more artists or one or more songs, wherein a system determines the musical constraint based on analyzing the selected artists or songs.

3. The computer-implemented method of claim 1, wherein the user interface:
   presents a recommended musical phrase for inclusion in the musical score, the recommended musical phrase being determined based on one or more machine learning models and the particular genre.

4. The computer-implemented method of claim 3, wherein the user interface presents a plurality of recommended musical phrases, wherein one of the plurality of recommended musical phrases is selected, and wherein the one or more machine learning models are updated based on the selection.

5. The computer-implemented method of claim 1, wherein the user interface:
   presents information identifying a portion of the musical score which deviates from the musical constraint;
   receives user input indicating an adjustment to the constraint; and
   adjusts one or more portions of the musical score based on the adjusted constraint.

6. The computer-implemented method of claim 1, wherein the user interface highlights a portion of the musical score as being similar to a different musical score, and wherein the system accesses a musical library database which stores the different musical score and determines measures of similarity between musical scores stored in the musical library database.

7. A computing system comprising one or more processors and non-transitory computer storage media storing instructions that when executed by the one or more processors, cause the one or more processors to perform operations comprising:
   receiving information identifying initiation of a music composition application, the music composition application being executed via a user device of a user, wherein the received information indicates a genre associated with a musical score being created via the music composition application;
   determining one or more constraints associated with the genre, wherein the one or more constraints indicate one or more features learned based on analyzing music associated with the genre;
   receiving musical elements specified by the user via the music composition application, and determining musical score updates based on the musical elements and genre, wherein a musical score update comprises information identifying a deviation of a portion of the musical score from a constraint; and
   providing, to the user device, the determined musical score updates.

8. The computing system of claim 7, wherein a musical score update further comprises a recommended musical phrase, the recommend musical phrase is generated via one or more machine learning models.

9. The computing system of claim 8, wherein the machine learning models comprise a recurrent neural network or a convolutional neural network.

10. The computing system of claim 7, wherein the operations further comprise:
    determining adjustments to the portion of the musical score based on the constraint, wherein the determined adjustments indicate adjustments to musical notes included in the portion to conform with the constraint; and
    causing, via the music composition application, updating of the portion based on the determined adjustments.

11. The computing system of claim 7, wherein the operations further comprise:
    receiving, from the user device, information identifying user adjustment of the constraint;
    analyzing the musical score, and determining one or more adjustments to be made to musical elements included in the musical score based on the adjusted constraint; and
    causing, via the music composition application, updating of the musical elements based on the determined adjustments.

12. The computing system of claim 7, wherein a musical score update further comprises information identifying that a portion of the musical score is similar to a different musical score, wherein the computing system accesses a musical library database and determines one or more measures of similarity between the portion and musical scores included in the musical library database, and wherein the musical library database stores the different musical score.

13. Non-transitory computer storage media storing instructions that when executed by a system of one or more processors, cause the one or more processors to perform operations comprising:

receiving information identifying initiation of a music composition application, the music composition application being executed via a user device of a user, wherein the received information indicates a genre associated with a musical score being created via the music composition application;

determining one or more constraints associated with the genre, wherein the one or more constraints indicate one or more features learned based on analyzing music associated with the genre;

receiving musical elements specified by the user via the music composition application, and determining musical score updates based on the musical elements and genre, wherein a musical score update comprises information identifying a deviation of a portion of the musical score from a constraint; and providing, to the user device, the determined musical score updates.

14. The computer storage media of claim 13, wherein a musical score update further comprises a recommended musical phrase, the recommend musical phrase being generated via one or more machine learning models.

15. The computer storage media of claim 14, wherein the machine learning models comprise a recurrent neural network or a convolutional neural network.

16. The computer storage media of claim 13, wherein the operations further comprise:

determining adjustments to the portion of the musical score based on the constraint, wherein the determined adjustments indicate adjustments to musical notes included in the portion to conform with the constraint; and causing, via the music composition application, updating of the portion based on the determined adjustments.

17. The computer storage media of claim 13, wherein a musical score update further comprises information identifying that a portion of the musical score is similar to a different musical score, wherein the computing system accesses a musical library database and determines one or more measures of similarity between the portion and musical scores included in the musical library database, and wherein the musical library database stores the different musical score.

* * * * *